United States Patent
Jacob

(10) Patent No.: US 7,433,100 B2
(45) Date of Patent: Oct. 7, 2008

(54) COLOR SEPARATION BASED ON MAXIMUM TONER LIMITS

(75) Inventor: Steve A. Jacob, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1169 days.

(21) Appl. No.: 10/448,596

(22) Filed: May 30, 2003

(65) Prior Publication Data

US 2005/0030559 A1   Feb. 10, 2005

(51) Int. Cl.
*G03F 3/08* (2006.01)
*G06F 15/00* (2006.01)
*H04N 1/46* (2006.01)

(52) U.S. Cl. .................... 358/518; 358/1.9; 358/501

(58) Field of Classification Search ............ 358/1.9, 358/515, 539, 525, 523, 540, 518, 529, 501, 358/504; 382/167, 162
See application file for complete search history.

(56) References Cited

U.S. PATENT DOCUMENTS

| | | | | |
|---|---|---|---|---|
| 5,155,588 A | * | 10/1992 | Levien | 358/519 |
| 5,844,415 A | * | 12/1998 | Gershenfeld et al. | 324/663 |
| 5,978,011 A | * | 11/1999 | Jacob et al. | 347/251 |
| 6,169,609 B1 | * | 1/2001 | Jacob et al. | 358/1.9 |
| 6,340,975 B2 | | 1/2002 | Marsden et al. | |
| 6,700,374 B1 | * | 3/2004 | Wu et al. | 324/312 |
| 6,829,061 B1 | * | 12/2004 | Jacob et al. | 358/1.9 |
| 2002/0015162 A1 | * | 2/2002 | Hoshii et al. | 358/1.2 |
| 2002/0075278 A1 | * | 6/2002 | Kakutani | 345/600 |
| 2003/0063299 A1 | * | 4/2003 | Cowan et al. | 358/1.9 |
| 2003/0098986 A1 | * | 5/2003 | Pop | 358/1.9 |
| 2003/0156299 A1 | * | 8/2003 | Martinez et al. | 358/1.9 |
| 2004/0008381 A1 | * | 1/2004 | Jacob et al. | 358/2.1 |
| 2004/0223173 A1 | * | 11/2004 | Arai | 358/1.9 |
| 2005/0052666 A1 | * | 3/2005 | Yamamoto et al. | 358/1.9 |
| 2005/0062985 A1 | * | 3/2005 | Lammens et al. | 358/1.9 |

* cited by examiner

Primary Examiner—Madeleine A Nguyen

(57) ABSTRACT

Various systems, methods, and programs embodied in a computer readable medium for determining color separation are provided. In one representative embodiment, a method is provided that comprises specifying a number of nodes along a number of ramps in a predefined color conversion space in a computer system. A maximum possible toner deposit is associated with each of these nodes. In addition, a maximum toner limit is specified for each one of the nodes along the ramps in the computer system. Each of the maximum toner limits is less than the maximum possible toner deposit. In addition, a color separation is determined for each of the nodes along the ramps in the computer system. Each of the color separations specifies up to a maximum amount of toner equaling a corresponding one of the maximum toner limits.

30 Claims, 12 Drawing Sheets

COLOR SEPARATION BASED ON MAXIMUM TONER LIMITS

BACKGROUND

Color printing typically requires the deposit of different color toners onto a print medium to form a number of pixels that make up the various images or text, etc. Each color pixel printed comprises a specific color. For each color created, a color separation is determined. The color separation refers to the amounts of each one the different color toners that are deposited on a print medium for a particular pixel that results in the desired color that one wishes to print.

For darker colors, the color separation may require large amounts of each of the different color toners to be deposited on the paper. However, difficulties occur when larger amounts of the different color toners are deposited onto a print medium for various pixels. Specifically, the toner may smear or difficulties may be experienced in trying to fuse larger amounts of toner per pixel to the print medium.

BRIEF DESCRIPTION OF THE DRAWINGS

The various embodiments of the invention can be understood with reference to the following drawings. The components in the drawings are not necessarily to scale. Also, in the drawings, like reference numerals designate corresponding parts throughout the several views.

DETAILED DESCRIPTION

Figure 1:
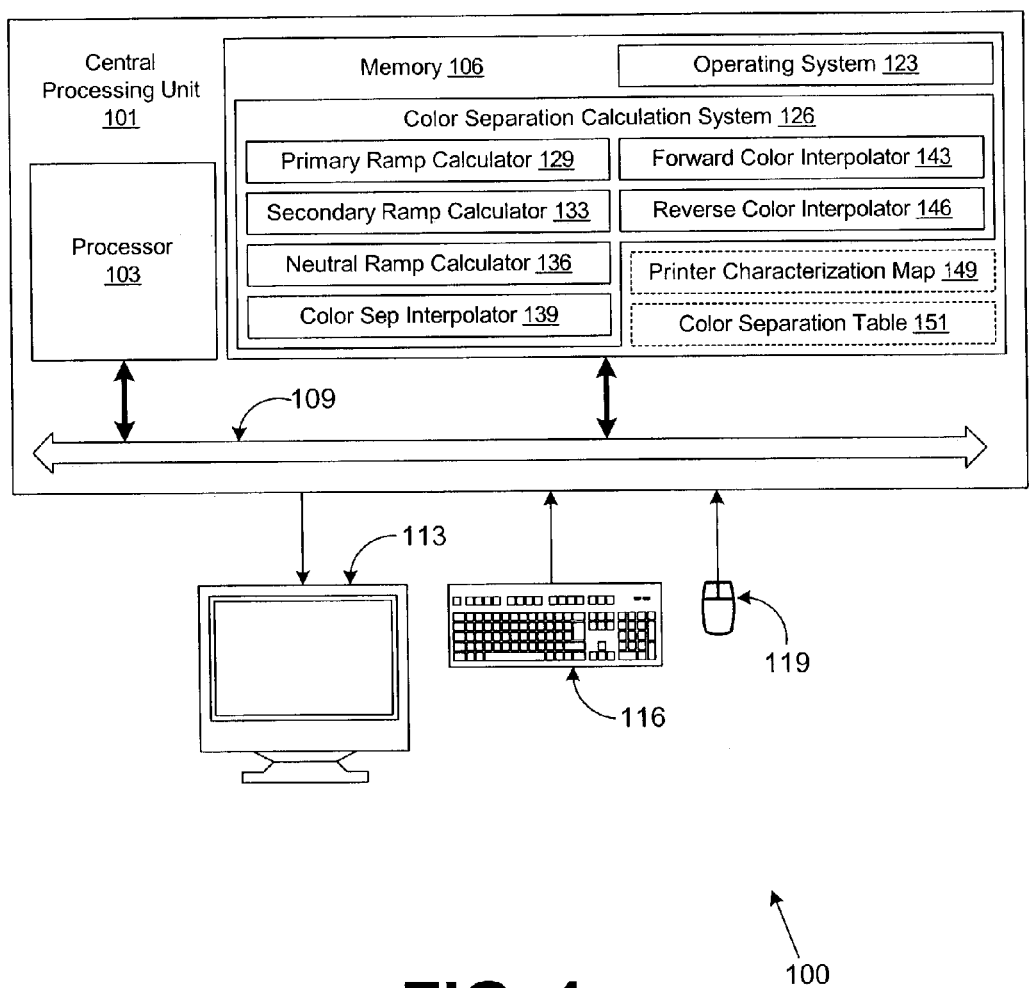
FIG. 1 is a schematic of a computer system upon which a color separation calculation system is executed to determine a color separation for printing according to an embodiment of the present invention.

With reference to FIG. 1, shown is a computer system 100 according to an embodiment of the present invention. The computer system 100 includes various components that are executed to determine color separations for a number of nodes specified within a predefined color conversion space for printing according to the various embodiments of the present invention as will be discussed. The color separations that are generated for each node by the computer system 100 specify a total amount of toner that is less than a maximum toner limit associated with each of the nodes, respectively. In this regard, the various embodiments of the present invention provides for the generation of colors, even dark colors, with lesser amounts of toner. In this respect, the problems caused by the deposit of too much toner on a print medium for specific colors such as darker colors is avoided.

In order to enable the determination of the color separations, the computer system 100 includes a central processing unit 101 having a processor circuit with a processor 103 and a memory 106, both of which are coupled to a local interface 109. The local interface 109 may be, for example, a data bus with an accompanying control/address bus as can be appreciated by those with ordinary skill in the art. The computer system 100 may be, for example, a general-purpose computer system or may be some other device with like capability.

The computer system 100 also may include a number of peripheral devices such as, for example, a display device 113, a keyboard 116, and a mouse 119. In addition, the computer system 100 may also include other peripheral devices such as, for example, a keypad, touch pad, touch screen, microphone, scanner, joystick, or one or more push buttons, etc. The peripheral devices may also include indicator lights, speakers, printers, etc. The display device 113 may be, for example, a cathode ray tube (CRT), liquid crystal display screen, gas plasma-based flat panel display, or other type of display device, etc.

A number of software components are stored in the memory 106 and are executable by the processor 103. In this respect, the term "executable" means a program file that is in a form that can be run by the processor 103. Examples of executable programs may be, for example, a compiled program that can be translated into machine code in a format that can be loaded into a random access portion of the memory 106 and run by the processor 103, or source code that may be expressed in proper format such as object code that is capable of being loaded into a random access portion of the memory 106 and executed by the processor 103, etc. An executable program may be stored in any portion or component of the memory 106 including, for example, random access memory, read-only memory, a hard drive, compact disk (CD), floppy disk, or other memory components.

The software components that are stored in the memory 106 include an operating system 123, a color separation calculation system 126, and a color separation table 151. Other software components may also be stored in the memory 106 that described herein as can be appreciated by those with ordinary skill in the art. The color separation calculation system 126 includes various components that are executed to perform various functions according to specific embodiments of the present invention. In this regard, the color separation calculation system 126 includes a primary ramp calculator 129, a secondary ramp calculator 133, a neutral ramp calculator 136, and a color separation interpolator 139. The color separation calculation system 126 also includes a forward color interpolator 143 and a reverse color interpolator 146. The forward and reverse color interpolators 143 and 146 are generated using a printer characterization map 149 as will be discussed. The various components of the color separation calculation system 126 is executed to generate a color separation table 151 that includes a color separation for each one of a number of nodes within a predefined color conversion space as will be described. In addition, the color separation calculation system 126 may include components that provide for the generation of graphical user interfaces displayed on the display device 113 or that provide for the manipulation of other interfaces to facilitate user input and/or manipulation of the color separation calculation system 126. In addition, the color separation calculation system 126 may include other components not discussed herein to perform various functions as are necessary.

Ultimately, the values stored in the color separation table 151 are employed to create, for example, a lookup table that may be employed within the firmware of a printer or other imaging device. Such a lookup table may map, for example, CMY values to CMYK values or some other conversion may be accomplished.

The memory 106 is defined herein as both volatile and nonvolatile memory and data storage components. Volatile components are those that do not retain data values upon loss of power. Nonvolatile components are those that retain data upon a loss of power. Thus, the memory 106 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 103 may represent multiple processors and the memory 106 may represent multiple memories that operate in parallel. In such a case, the local interface 109 may be an appropriate network that facilitates communication between any two of the multiple processors, between any processor and any one of the memories, or between any two of the memories etc. The processor 103 may be of electrical, optical, or molecular construction, or of some other construction as can be appreciated by those with ordinary skill in the art.

The operating system 123 is executed to control the allocation and usage of hardware resources such as the memory, processing time and peripheral devices in the computer system 100. In this manner, the operating system 123 serves as the foundation on which applications depend as is generally known by those with ordinary skill in the art.

Figure 2:
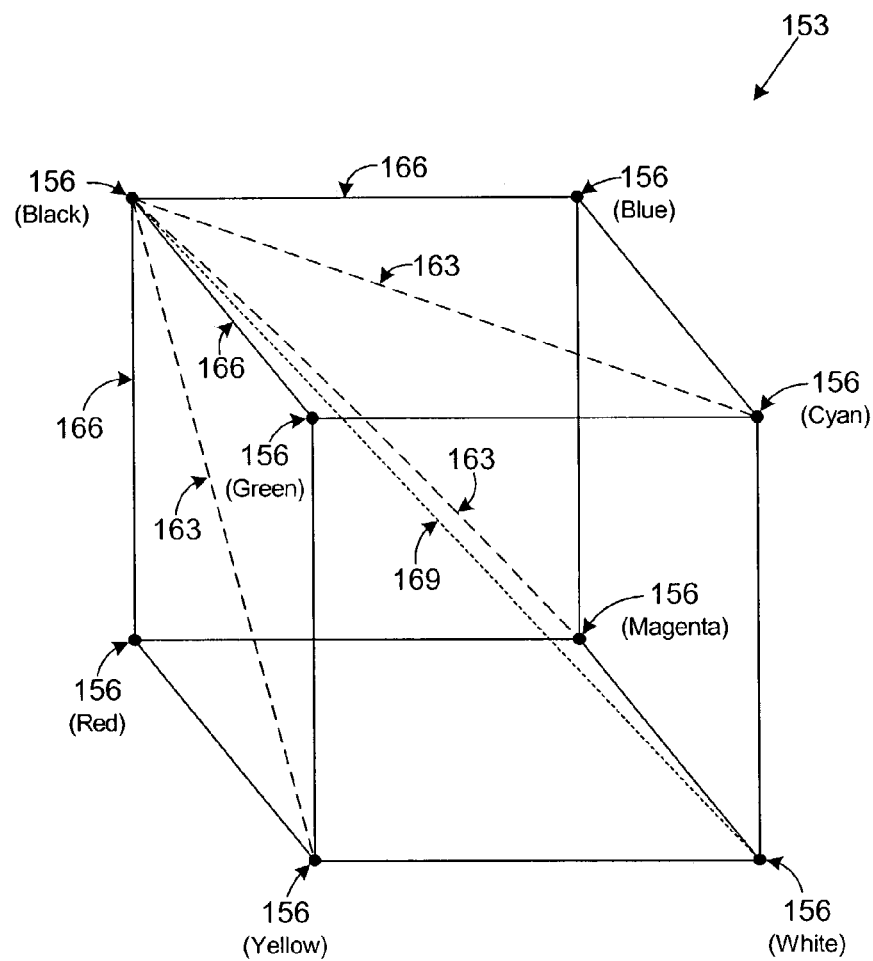
FIG. 2 is a drawing of an example of a color conversion space for which the color separation calculation system of FIG. 1 may be executed to determine the color separation for printing according to an embodiment of the present invention.

Turning then, to FIG. 2, shown is a drawing of an example of a color conversion space 153 in three dimensions for which the color separation calculation system of FIG. 1 may be executed to determine the color separation for printing according to an embodiment of the present invention. The color conversion space 153 depicts a relationship between a red-green-blue (RGB) color space and a cyan-magenta-yellow (CMY) color space. While the color conversion space 153 of FIG. 2 depicts a transition between RGB and CMY color spaces, it is understood that the color conversion space 153 is merely an example of any one of a number of different color conversion spaces for which color separation may be determined using the principles discussed herein and described in the appended claims.

In the example color conversion space 153, a number of nodes 156 are defined including a black node and a white node. Also, the nodes 156 include primary colors such as cyan, magenta, and yellow. The nodes 156 further include secondary colors such as red, green, and blue. The color conversion space 153 also includes a number of ramps between respective ones of the nodes 156. Specifically, the color conversion space 153 includes primary ramps 163 between the black node and each one of the primary color nodes such as cyan, magenta, and yellow. In addition, the color conversion space 153 includes secondary ramps 166 between the black node and each of the secondary color nodes such as red, green, and blue. Also, the color conversion space 153 includes a neutral ramp 169 between the black and white nodes. In this respect, the neutral ramp 169 follows the neutral axis of the color conversion space 153. Each of the ramps 163, 166, and 169 denote a transition from one color to another as should be apparent to those with ordinary skill in the art.

Figure 3:
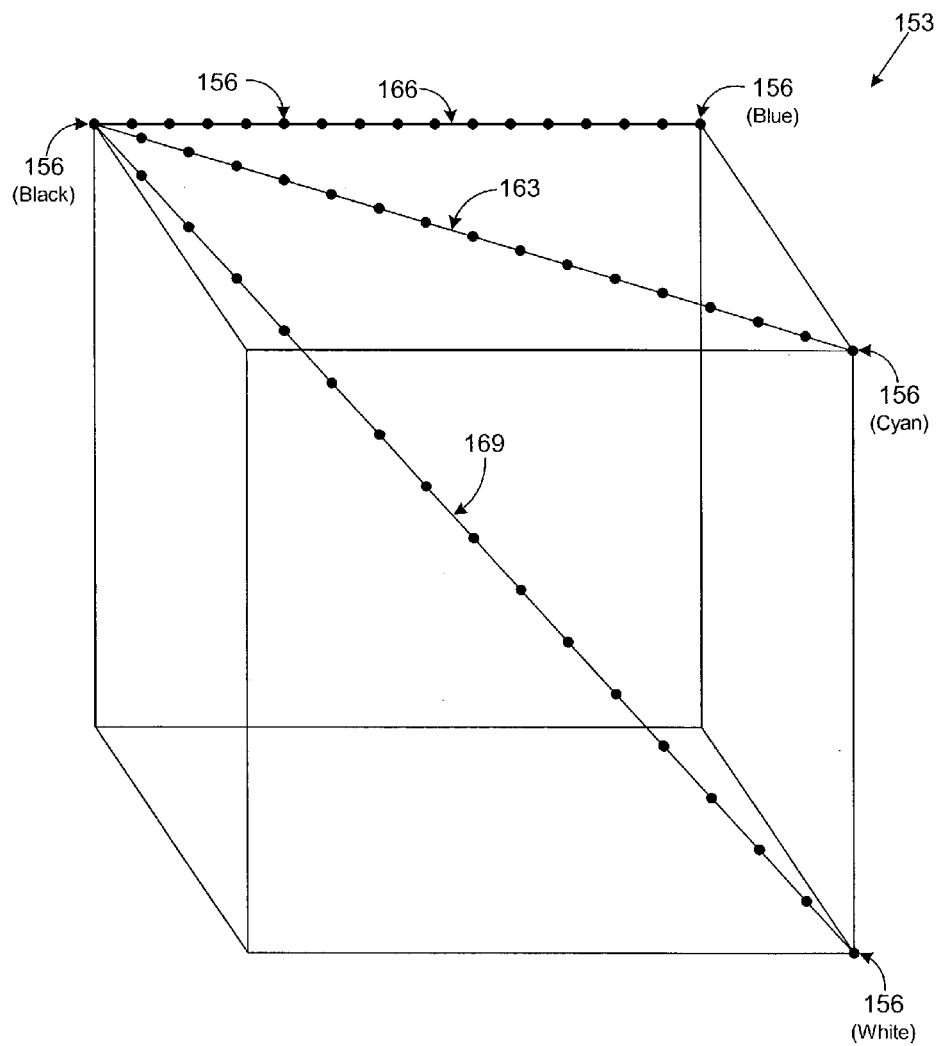
FIG. 3 is a drawing of the example of the color conversion space of FIG. 2 that indicates a number of nodes on a number of ramps for which the color separation is determined by the color separation calculation system of FIG. 1 according to an embodiment of the present invention.

With reference to FIG. 3, shown is a drawing that provides a second view of the color conversion space 153 in three dimensions according to an embodiment of the present invention. According to an embodiment of the present invention, a number of nodes 156 are defined in the color conversion space 153 that include specific ones of the corner nodes described above. The nodes 156 are arranged in a three dimensional grid that appears as a cube with 17 nodes 156 on each axis. Thus, the total number of nodes within the entire color conversion space 153 including the nodes 156 falling on all ramps and the nodes 156 between the ramps may be calculated as $17^3$ for a total of 4913 nodes. However, it is understood that any number of nodes 156 may be defined in the color conversion space 153. Each of the nodes 156 provides a discrete set of points within the color conversion space 153 for which a color separation is to be calculated. These color separations are included in a lookup table that is used to translate pixels expressed, for example, in the RGB color space into the CMYK color space, assuming that the color separation calculated for each of the nodes 156 includes CMYK color components. In this respect, the lookup tables provide the amounts of each color of toner (i.e. cyan, yellow, magenta, and black) that are deposited on a print medium to generate a resulting color. Thus, the discrete number of nodes defined in the color conversion space 153 depends upon how much color resolution that one wishes to attain in the lookup table used for color conversion.

The color conversion space 153 is depicted with a primary ramp 163, a secondary ramp 166, and a neutral ramp 169. The nodes 156 defined or specified along each one of the ramps 163, 166, and 169 are "initial" ones of the nodes 156. The initial ones of the nodes 156 are distinguished from remaining or "interstitial" (not shown) ones of the nodes 156 in that a color separation is determined for the initial ones of the nodes 156 along a predefined number of the ramps 163, 166, 169 before determining a color separation for the interstitial ones of the nodes 156. The interstitial ones of the nodes 156 are those that fall between the initial ones of the nodes 156 located on the various ramps 163, 166, and 169. The color separations of the interstitial ones of the nodes 156 are interpolated from the initial ones of the nodes 156. In one embodiment, there are 17 initial ones of the nodes 156 on each one of the ramps 163, 166, and 169, although any number of initial ones of the nodes 156 may be defined or specified along the ramps 163,166, and 169.

Each of the nodes 156 is specified or defined in the color separation table 151 in the memory 106 (FIG. 1) using, for example, an array or other storage arrangement. In this respect, the color separation that is ultimately determined for each of the nodes 156 is stored in the color separation table 151.

Given the above descriptions of the computer system 100 and the color conversion space 153, next a general description of the operation of the color separation calculation system 126 is provided. To begin, a color gamut for a candidate printer is measured or characterized and the printer characterization map 149 is generated. To do this, first a specific set of color patches are printed using the candidate printer such as, for example, color patches specified by the IT8 Characterization Set as set forth by the American National Standards Institute, ANSI IT8.7/3-1993, although other sets of color patches may be employed.

The color patches are printed, for example, with CMYK color toners using amounts of toner that range up to a full 400%. The CMYK values employed to generate each of the color patches are recorded in the printer characterization map 149. Then, each of the color patches may be measured using a spectrophotometer to determine corresponding L*a*b* values as specified by the Commission Internationale de l'Eclairage (CIE). The L*a*b* values are then placed in the printer characterization map 149 in association with their respective CMYK values for the respective color patches.

The printer characterization map 149 is then used to create the forward color interpolator 143 and the reverse color interpolator 146. The forward color interpolator 143 and the reverse color interpolator 146 may both be generated using algorithms set forth in the following published article: David T. Sandwell, *Biharmonic Spline Interpolation of GEOS-3 and SEASAT Altimeter Data,* Geophysical Research Letters, 2,139-142, 1987, such article being incorporated herein by reference in its entirety. In this respect, interpolation is discussed using values or gradients of values in any dimension. Also, in order to facilitate the interpolation of the "K" component of the CMYK color space, for example, the "K" component from the CMYK color space is appended to the L*a*b* color space to form a new color space L*a*b*K, or LABK. Once generated, the forward color interpolator 143 may be employed to convert any color expressed in CMYK color space into LABK color space. Also, the reverse color interpolator 146 may be employed to convert any color expressed in LABK color space into CMYK color space. The conversions are an approximation as can be appreciated by those with ordinary skill in the art. The generation of the forward and reverse color interpolators 143 and 146 as set forth in the above-identified article is generally understood by those skilled in the art and not discussed in detail herein.

The fact that the forward and reverse color interpolators 143 and 146 are generated based upon a characterization of a given printer provides a distinct advantage in that the resulting color separations for each of the nodes 156 (FIG. 2) determined using the forward and reverse color interpolators 143 and 146 are based upon or are determined using a characterization of the printer itself. As a consequence, the toner limited colors generated by the printer using the respective color separations more accurately reflect the colors generated by the printer in the printer characterization map 149, thereby reducing inaccuracy in color printing using the respective printer.

Once the forward and reverse color interpolators 143 and 146 have been generated, the color separation calculation system 126 may proceed with the determination of the color separations for each of the nodes 156. In doing so, the color separation calculation system 126 first calculates a color separation for nodes 156 that fall along a first one of the primary ramps 163, a first one of the secondary ramps 166, and the neutral ramp 169. In this respect, the color separation calculation system 126 executes the primary ramp calculator 129, the secondary ramp calculator 133, and the neutral ramp calculator 136. The specific functions of various embodiments of the primary ramp calculator 129, the secondary ramp calculator 133, and the neutral ramp calculator 136 will be discussed with reference to figures that follow. In addition, the primary ramp calculators 129 may be employed to calculate the color separations of the nodes 156 of two or more unique primary ramps 163 and the secondary ramp calculator 133 may be employed to calculate the color separations of the nodes 156 of two or more unique secondary ramps 166, where the color separations calculated are employed by the color separation interpolator 139.

To facilitate the calculation of the color separations for the nodes 156 falling on the primary and secondary ramps 129 and 133, a maximum toner limit is specified or defined for each of the nodes 156 along these primary and secondary ramps 163 and 166. In addition, maximum toner limits for the nodes that fall along the neutral ramp 169 may be specified. This may be done, for example, by writing a maximum toner limit directly into the primary, secondary, and neutral ramp calculators 129,133, and 136 for each of the nodes 156 falling on such ramps. Alternatively, a user may input a maximum toner limit for each of the nodes 156 falling on the respective primary, secondary, and neutral ramps 163, 166, and 169 by manipulating a user interface generated on the display device 113, etc. In still another alternative, the maximum toner limits may be stored in a predefined location of the memory 106 or some other approach may be taken to specify or define the maximum toner limits.

Each of the maximum toner limits provide a benchmark that is used to limit the amount of toner that is placed on a print medium to generate the color specified in a corresponding one of the nodes 156 falling on one of the ramps 163,166, and 169. In this respect, each of the maximum toner limits is less than a maximum possible toner deposit that can be placed on a print medium for a given pixel. The maximum possible toner deposit may be, for example, 100% of a predefined quantity of each color of toner (i.e. cyan, magenta, yellow, and black) for a given pixel. The actual predefined quantity may vary from printer to printer as can be appreciated by those with ordinary skill in the art. The color separation that is determined for each of the nodes 156 falling on the ramps 163, 166, and 169 specifies an amount of each color of toner for a total aggregate amount of toner that is less than or equal to a corresponding maximum toner limit associated with each of the nodes 156, respectively. In this respect, the color separation is calculated for each of the nodes 156 falling on one of the ramps 163, 166, and 169 based upon a maximum toner limit.

Once the color separations are determined for each of the nodes 156, then the color separation interpolator 139 is executed to determine the color separations for the nodes falling on the remaining ones of the primary and secondary ramps 163 and 166 unless color separations are determined for the nodes 156 of all of the primary and secondary ramps 163 and 166. Also, the color separation interpolator 139 interpolates the color separations for the remaining or "interstitial" nodes specified or defined in the color conversion space 153 that do not fall on any of the ramps 163, 166, and 169. That is to say, the color separations for the interstitial ones of the nodes 156 are interpolated from the color separations of the nodes 156 falling on the primary, secondary, and neutral ramps 163,166, and 169 as will discussed. All of the color separations generated for the nodes 156 are stored in the color separation table 151 (FIG. 1).

Figure 4:
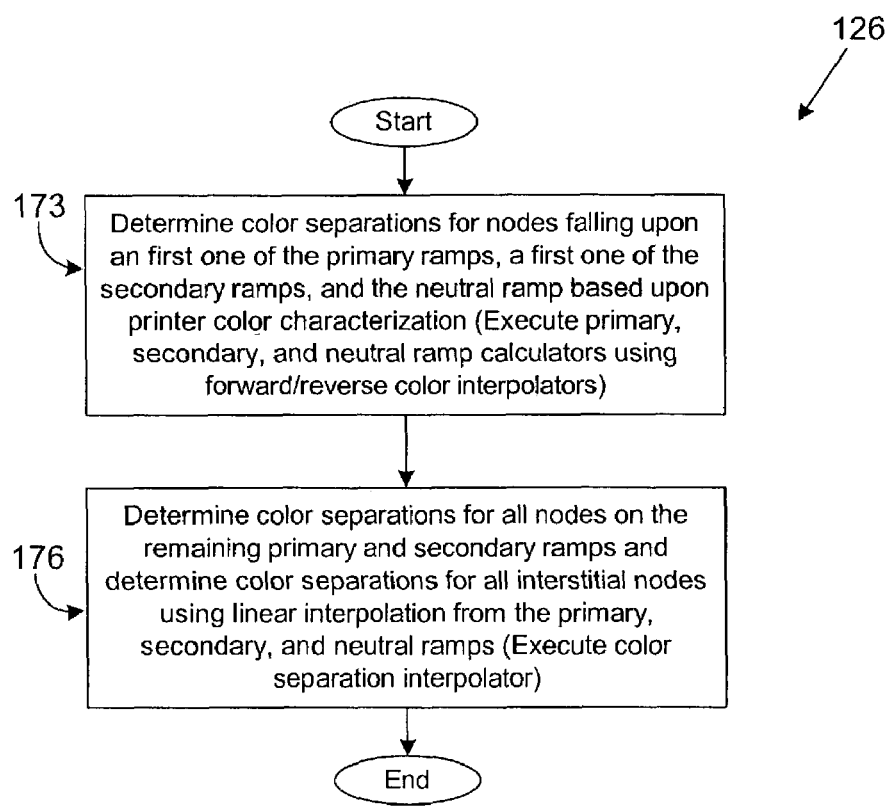
FIG. 4 is an example of a flow chart of the operation of the color separation calculation system of FIG. 1 according to an embodiment of the present invention.

With reference to FIG. 4, shown is a flow chart that provides one example of the operation of the color separation calculation system 126 according to an embodiment of the present invention. Alternatively, the flow chart of FIG. 4 may be viewed as depicting steps of an example of a method implemented in the computer system 100 (FIG. 1) to generate the maximum toner limited color separations for all of the nodes 156 (FIG. 3). The functionality of the color separation calculation system 126 as depicted by the exemplary flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The color separation calculation system 126 may be implemented using any one of a number of programming languages such as, for example, C, C++, JAVA, or other programming languages. Alternatively, a programming language such as MATLAB promulgated by Mathworks of Natick, Me. may be employed.

Beginning with box 173, the color separation calculation system 126 first determines color separations for nodes along a first one of the primary ramps 163, a first one of the secondary ramps 166, and the neutral ramp 169. Each of the color separations determined specifies up to a maximum amount of toner, the maximum amount of toner being equal to a maximum toner limit associated with a respective one of the nodes. The maximum toner limits are less than a maximum possible toner deposit (i.e. 400% toner) that may be placed on the paper for a given color. This may be accomplished by executing the primary, secondary, and neutral ramp calculators 129, 133, and 136. By virtue of the fact that the forward and reverse color interpolators 143 and 146 that Were generated using the printer characterization map 149 are employed in determining the color separations for the nodes 156 falling along the first ones of the primary and secondary ramps 163 and 166, the color separations are thus determined based upon a printer color characterization expressed in the printer characterization map 149.

Once the color separations are known for the nodes that fall upon the first ones of the primary and secondary ramps 163 and 166, and the neutral ramp 169, then the color separation calculation system 126 proceeds to box 176. In box 176, the color separations for the node falling on the remaining primary and secondary ramps 163 and 166 are determined and the color separations for all of the interstitial nodes are interpolated from the color separations of all of the ramps 163, 166, and 169. To determine the color separations for the remaining primary and secondary ramps 163 and 166, the color separations from the nodes 156 of the first ones of the primary and secondary ramps 163 and 166 may be employed where CMY color planes are swapped accordingly. Thereafter, the color separation calculation system 126 ends as shown. Once determined, the color separations from all of the nodes 156 are stored in the color separation table 151 that is ultimately employed in a printer for printing.

Alternatively, the primary ramp calculator 129 and the secondary ramp calculator 133 may be employed to determine the color separations for the nodes 156 of all of the primary and secondary ramps 163 and 166, rather than swapping CMY color planes as discussed above. In this respect, individual maximum toner limits may be specified for each node 156 that falls upon one of the primary and secondary ramps 163 and 166. Such maximum toner limits may be employed to determine a color separation for each of the respective nodes 156 for each one of the primary and secondary ramps 163 and 166 in a manner similar to that discussed above with reference to the first ones of the primary and secondary ramps 163 and 166.

Figure 5:
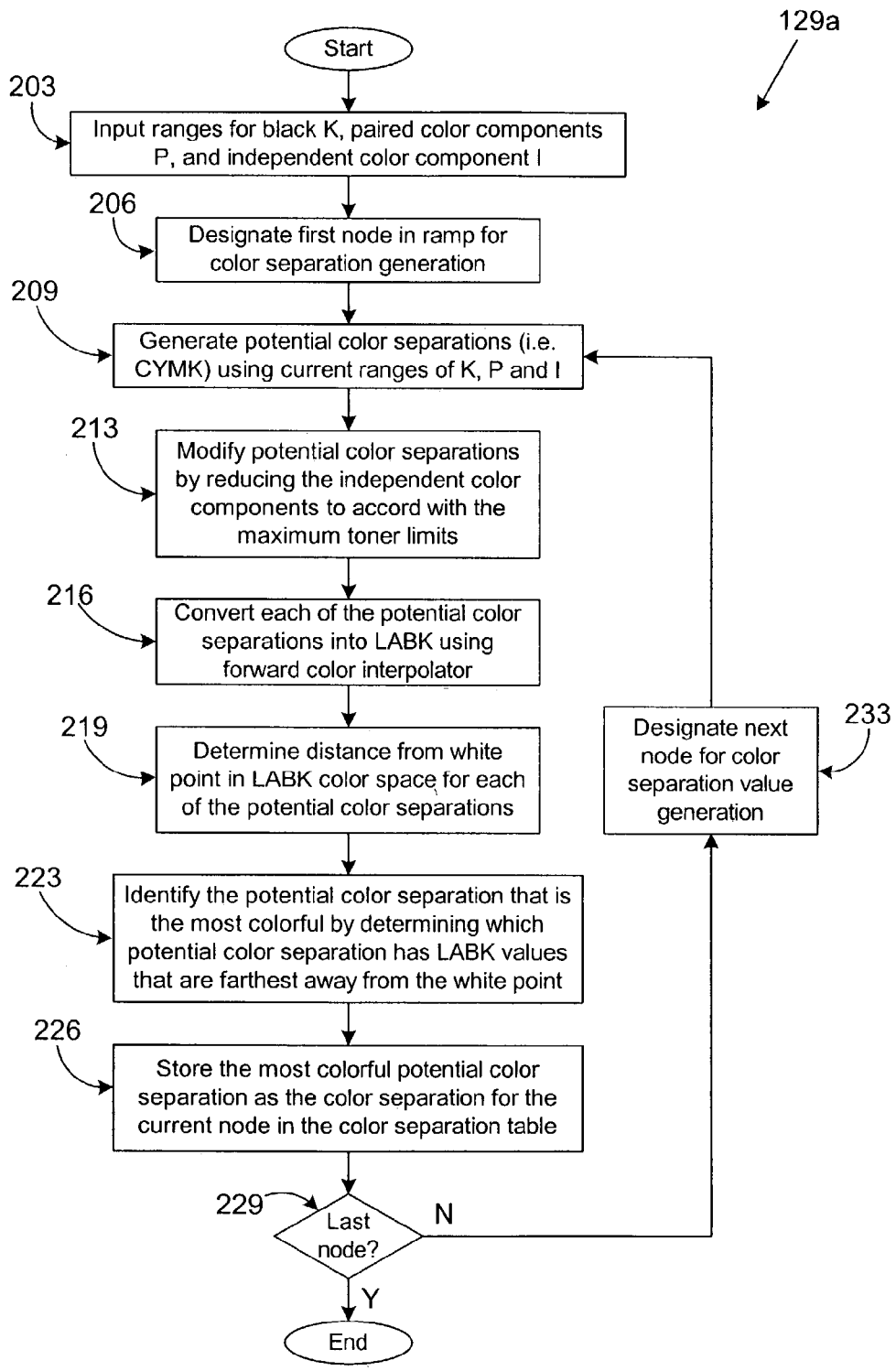
FIG. 5 is an example of a flow chart of a first embodiment of a primary ramp calculator that is executed as a component of the color separation calculation system of FIG. 1 according to an embodiment of the present invention.

Referring next to FIG. 5, shown is a flow chart that provides one example of the operation the primary ramp calculator 129 denoted herein as primary ramp calculator 129a according to an embodiment of the present invention. Alternatively, the flow chart of FIG. 5 may be viewed as depicting steps of an example of a method implemented in the computer system 100 (FIG. 1) to generate the maximum toner limited color separations for the nodes 156 (FIG. 3) of a first one of the primary ramps 163 (FIG. 2). In this respect, the functionality of the flow chart of FIG. 5 would be executed for a first one of the primary ramps 163 for which color separations are to be determined. The functionality of the primary ramp calculator 129a as depicted by the exemplary flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The primary ramp calculator 129a may be implemented using any one of a number of programming languages such as, for example, C, C++, JAVA, or other programming languages. Alternatively, a programming language such as MATLAB promulgated by Mathworks of Natick, Me. may be employed.

Beginning with box 203, a number of ranges are input through the manipulation of one or more user interfaces displayed on the display device 113. The ranges provide values that indicate a percentage of the black values K, paired color components P, and an independent color component I. The paired color components P are those color components that are equal for the color separations for a respective primary ramp 163. For example, assume that the color separations are being determined for the nodes 156 of a primary ramp 163 extending between the black node 156 and the cyan node 156. In such case, in the CMYK color space, the magenta and yellow color components are equal at all points along the ramp. The cyan color component varies independently and thus serves as the independent color component I.

The ranges for the paired color components P are centered at a relatively low value, such as, for example, near 0% for all nodes 156 along the ramp 163. Also, the range for the independent color component I is centered at a relatively high value, such as, for example, near 100% for all nodes 156 along the ramp 163. Regardless of where values are located or ranges are centered, at each node the values for paired color components P are less than the values for the independent color component I. Also, values for black K may be determined based upon the distance of a respective node 156 from the black node 156 along the current primary ramp 163 or using some other approach. For example, the values for black K may reduce in magnitude as the distance from the black node 156 increases.

The ranges input for K, P, and I in box 203 may be any value or range of values within the entire range of 0% to 100%. To generate each potential color separation for a particular node, the ranges indicate the potential values for K, P, and I that can be employed in the potential color separations. Each range may be divided into a number of values that can be used to generate the potential color separations. For example, a range for the paired color components may be specified as between 40% to 50% of the total possible amount of toner for each of the paired color components. The range may be divided into 6 different values, thereby providing 40%, 42%, 44%, 46%, 48%, and 50% as the possible values that may be employed in generating the potential color separations. Given that there may be multiple values for K, P, and I, then the total number of potential color separations would equal (K×P×I). Alternatively, each of the ranges may be set equal to a single value where no variation K, P, or I is desired.

Once the ranges for K, P, and I are specified in box 203, then the primary ramp calculator 129*a* proceeds to box 206 in which a first node in the primary ramp 163 for which color separations are being calculated is designated for color separation generation. Thereafter, in box 209, potential color separations in an appropriate color space such as, for example, a CMYK color space are generated using the ranges specified for K, P, and I. These potential color separations are stored, for example, in an array in the memory 106. Then, in box 213, the potential color separations generated in box 209 are modified to accord with the maximum toner limitation specified or defined for the current initial one of the nodes 156. In this respect, the independent color component I is reduced, for example, as is necessary so that the total amount of toner specified is less than or equal to the maximum toner limit for a respective node 156.

Then, in box 216, each of the potential color separations is converted into the LABK color space. To do this, the forward color interpolator 143 is executed for each of the potential color separations. In this respect, the potential color separations expressed in the LABK color space may be stored in a separate array in the memory 106. Due to the fact that the printer characterization map 149 is used to generate the forward color interpolator 143, the potential color separations expressed in the LABK color space are based upon the printer color characterization.

Then, in box 223, the potential color separation is identified that is the most "colorful." This is determined, for example, by identifying which one of the potential color separation in the LABK color space is the farthest away from the white point in the LABK color space. To make this determination, the distance of the potential color separation from the white point is calculated in Cartesian coordinates using the L*a*b* components in the LABK color space. The LABK color space is composed of the CIE L*a*b* color space, where the K component is copied from the CMYK values employed in printing the printer characterization map 149. In this respect, the LABK color space provides for convenience in performing multi-dimensional interpolation, where the K component is ignored for all other calculations.

Once the most colorful of potential color separations is known, then the primary ramp calculator 129*a* proceeds to box 226 in which the most colorful one of the potential color separations is stored in the color separation table 151 as a color separation for the current node 156. Thereafter, in box 229 the primary ramp calculator 129*a* determines if a color separation has been determined for the last node 156 in the primary ramp 163. If not, then the primary ramp calculator 129*a* proceeds to box 233 to designate the next node 156 for which a color separation is to be calculated. Thereafter, the primary ramp calculator 129*a* reverts back to box 209 as shown. However, if a color separation has been determined for the last node 156 in the primary ramp 163, then the primary ramp calculator 129*a* ends accordingly.

Figure 6:
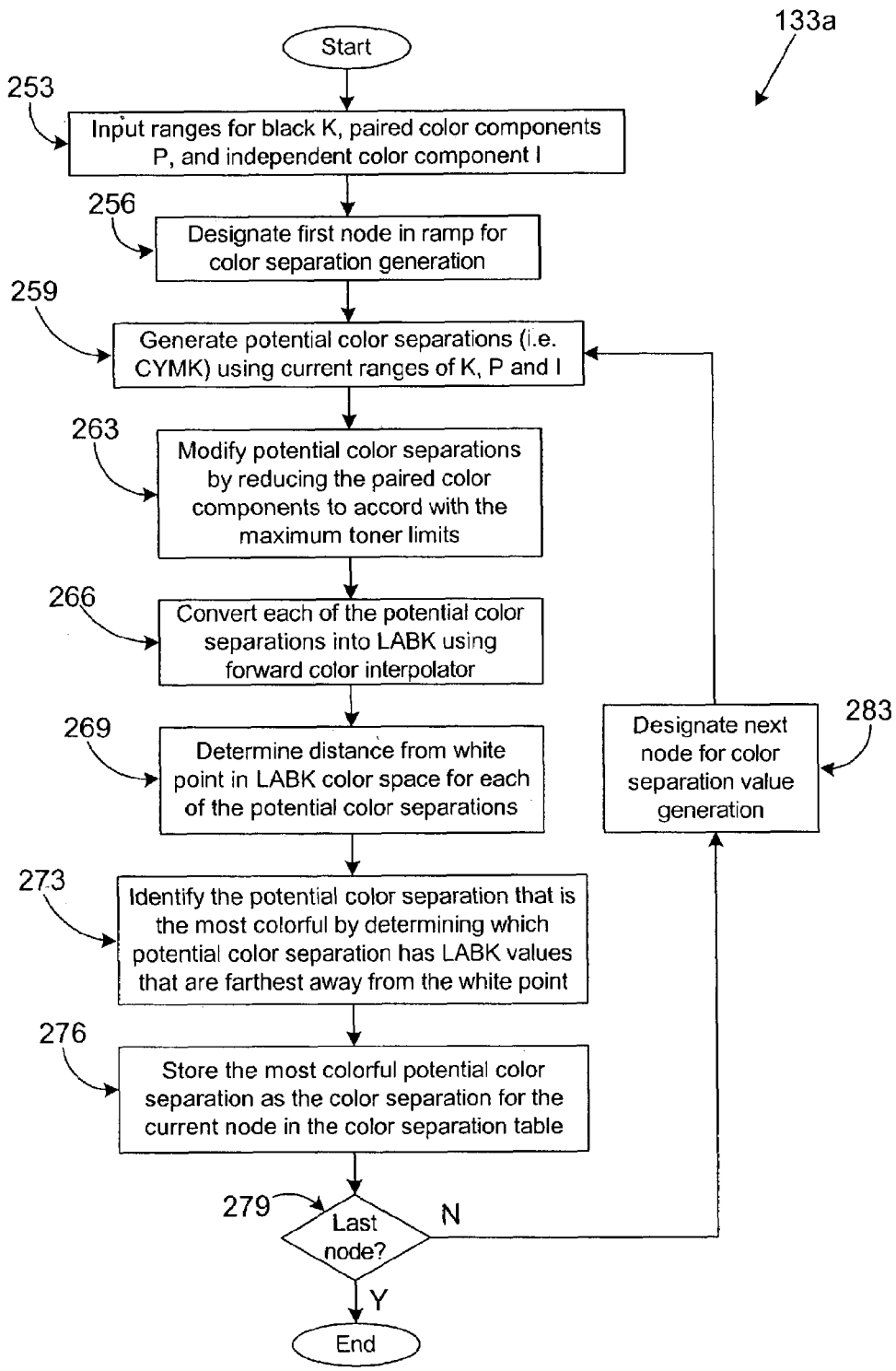
FIG. 6 is an example of a flow chart of a first embodiment of a secondary ramp calculator that is executed as a component of the color separation calculation system of FIG. 1 according to an embodiment of the present invention.

Referring next to FIG. 6, shown is a flow chart that provides one example of the operation of a first embodiment of the secondary ramp calculator 133 denoted herein as secondary ramp calculator 133*a* according to an embodiment of the present invention. Alternatively, the flow chart of FIG. 6 may be viewed as depicting steps of an example of a method implemented in the computer system 100 (FIG. 1) to generate the maximum toner limited color separations for the nodes 156 (FIG. 3) of a first one of the secondary ramps 166 (FIG. 2). In this respect, the functionality of the flow chart of FIG. 5 would be executed for a first one of the secondary ramps 166 for which color separations are to be determined. The functionality of the secondary ramp calculator 133*a* as depicted by the exemplary flow chart of FIG. 5 may be implemented, for example, in an object oriented design or in some other programming architecture. Assuming the functionality is implemented in an object oriented design, then each block represents functionality that may be implemented in one or more methods that are encapsulated in one or more objects. The secondary ramp calculator 133*a* may be implemented using any one of a number of programming languages such as, for example, C, C++, JAVA, or other programming languages. Alternatively, a programming language such as MAT-LAB promulgated by Mathworks of Natick, Me. may be employed.

Beginning with box 253, a number of ranges are input through the manipulation of one or more user interfaces displayed on the display device 113. The ranges provide values that indicate a percentage of the black values K, paired color components P, and an independent color component I. The paired color components P are those color components that are equal for the color separations for a respective secondary ramp 166. For example, assume that the color separations are being determined for the nodes 156 of a secondary ramp 166 extending between the black node 156 and the blue node 156. In such case, in the CMYK color space, the cyan and magenta color components are equal at all points along the ramp. The yellow color component varies independently and thus serves as the independent color component I.

The ranges for the paired color components P are centered at a relatively high value, such as, for example, near 100% for all nodes 156 along the ramp 166. Also, the range for the independent color component I is centered at a relatively low value, such as, for example, near 0% for all nodes 156 along the ramp 166. Regardless of where values are located or ranges are centered, at each node the values for paired color components P are greater than the values for the independent color component I. Also, values for black K may be calculated, for example, based upon the distance of a respective node 156 from the black node 156 along the current secondary ramp 166 or using some other approach. For example, the values for black K may reduce in magnitude as the distance from the black node 156 increases. The ranges for K, P, and I may be determined in a manner similar that discussed with reference to FIG. 5 above.

Once the ranges for K, P, and I are specified in box 253, then the secondary ramp calculator 133*a* proceeds to box 256 in which a first node in the secondary ramp 166 for which color separations are being calculated is designated for color separation generation. Thereafter, in box 259, potential color separations in an appropriate color space such as, for example, a CMYK color space are generated using the ranges specified for K, P, and I. These potential color separations are stored, for example, in an array in the memory 106. Then, in box 263, the potential color separations generated in box 209 are modified to accord with the maximum toner limitation specified or defined for the current initial one of the nodes 156. In this respect, the values of the paired color components P are reduced, for example, as necessary so that the total amount of toner specified is less than or equal to the maximum toner limit for a respective node 156.

Then, in box 266, each of the potential color separations is converted into the LABK color space. This conversion is performed by a multi-dimensional interpolation using the forward color interpolator 143. In this respect, the potential color separations expressed in the LABK color space may be stored in a separate array in the memory 106. Due to the fact that the printer characterization map 149 is used to generate the forward color interpolator 143, the potential color separations expressed in the LABK color space are based upon the printer color characterization.

Then, in box 273, the potential color separation is identified that is the most "colorful." This is determined, for example, by identifying which one of the potential color separation in the LABK color space is the farthest away from the white point in the LABK color space. To make this determination, the distance of the potential color separation from the white point is calculated in Cartesian coordinates. The LABK color space is composed of the CIE L*a*b* color space, where the K component is copied from the CMYK values employed in printing the printer characterization map 149. In this respect, the LABK color space provides for convenience in performing multi-dimensional interpolation, where the K component is ignored for all other calculations.

Once the most colorful of potential color separations is known, then the secondary ramp calculator 133a proceeds to box 276 in which the most colorful one of the potential color separations is stored in the color separation table 151 as a color separation for the current node 156. Thereafter, in box 279 the secondary ramp calculator 133a determines if a color separation has been determined for the last node 156 in the secondary ramp 166. If not, then the secondary ramp calculator 133a proceeds to box 283 to designate the next node 156 for which a color separation is to be calculated. Thereafter, the secondary ramp calculator 133a reverts back to box 259 as shown. However, if a color separation has been determined for the last node 156 in the secondary ramp 166, then the secondary ramp calculator 133a ends accordingly.

Figure 7:
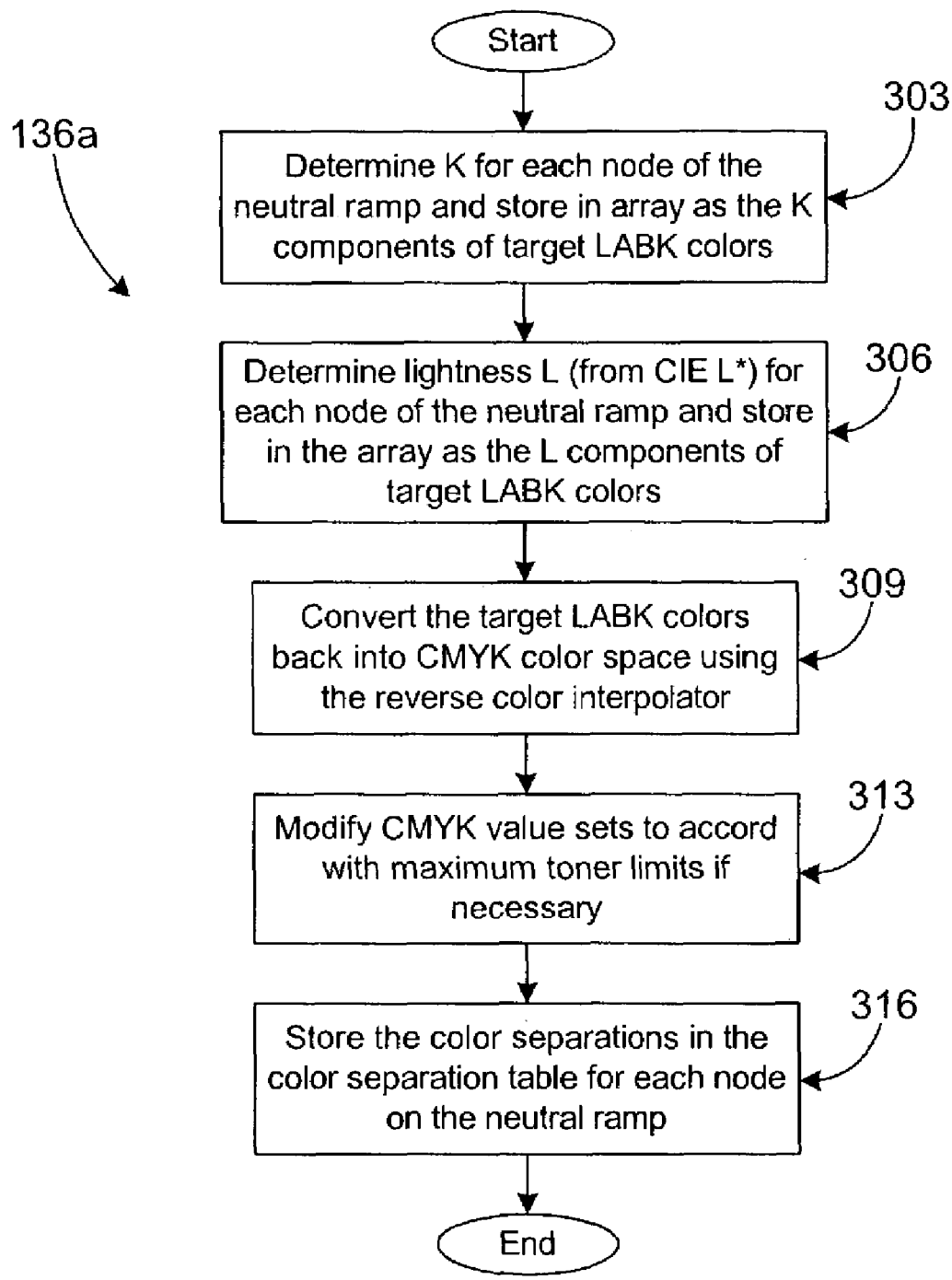
FIG. 7 is an example of a flow chart of a first embodiment of a neutral ramp calculator that is executed as a component of the color separation calculation system of FIG. 1 according to an embodiment of the present invention.

Referring next to FIG. 7, shown is a flow chart that provides one example of the operation of the neutral ramp calculator 136 that is denoted herein as neutral ramp calculator 136a according to an embodiment of the present invention. Alternatively, the flow chart of FIG. 7 may be viewed as depicting steps of an example of a method implemented in the computer system 100 (FIG. 1) to generate a maximum toner limited color separation for each of the nodes falling on the neutral ramp 169 (FIG. 2). The functionality of the neutral ramp calculator 136a as depicted by the exemplary flow chart of FIG. 7 may be implemented, for example, in an object oriented design or in some other programming architecture. Assuming the functionality is implemented in an object oriented design, then each block represents functionality that may be implemented in one or more methods that are encapsulated in one or more objects. The neutral ramp calculator 136a may be implemented using any one of a number of programming languages such as, for example, C, C++, JAVA, or other programming languages. Alternatively, a programming language such as MATLAB promulgated by Mathworks of Natick, Me. may be employed.

Beginning with box 303, the neutral ramp calculator 136a determines a black value K for each node 156 of the neutral ramp 169 and stores the black values K in an array as the K components of target LABK colors. This may be done, for example, by using a linear calculation, an exponential calculation, or other calculation using an appropriate equation to indicate the black value K for each node along the neutral ramp 169 as will be described in FIG. 8. Alternatively, the values for black K for each node 156 along the neutral ramp 169 may be input individually, etc. Thereafter, in box 306, a lightness L is identified for each of the nodes 156 along the neutral ramp 169 from the CIE L*a*b* color space. The lightness L determined for each of the nodes 156 are also stored in the array as the L components of the target LABK colors. A lightness L may be determined for each of the nodes 156, for example, by converting the white point in CMYK color space (i.e. 0% for each color component) into LABK color space using the forward color interpolator 143. The LABK values for the white point fall on the white end of the neutral ramp 169. Then, the black point in CMYK color space (i.e. 100% for each color component) is converted into LABK color space using the forward color interpolator 143. The LABK values for the black point fall on the black end of the neutral ramp 169. The L* values from these LABK color sets are used as endpoints of a linear curve or other appropriate curve to approximate L* for the intermediate nodes on the neutral ramp 169. Due to the fact that the forward color interpolator 143 is employed in this manner, the L* values obtained are based upon the characterization of the respective printer that was employed to create the printer characterization map 149 (FIG. 1).

Then, in box 309, the target LABK colors expressed in the LABK color space for the nodes 156 along the neutral ramp 169 are converted to a desired color space such as, for example, a CMYK color space. In such a case, the A and B values of the target LABK colors are zero since these values fall on the neutral ramp 169.

In box 313, the CMYK values are modified to accord with the predefined maximum toner limits for each of the nodes 156 on the neutral ramp 169. In this respect, the modification is made, for example, by reducing equal amounts of cyan, magenta, and yellow color components for each node as necessary, where the values of each of these components is equal. Then, in box 316, the color separations expressed in the CMYK color space or other appropriate color space for printing are stored in the color separation table 151 (FIG. 1) in the memory 106 (FIG. 1). Thereafter, the neutral ramp calculator 136a ends accordingly.

Figure 8:
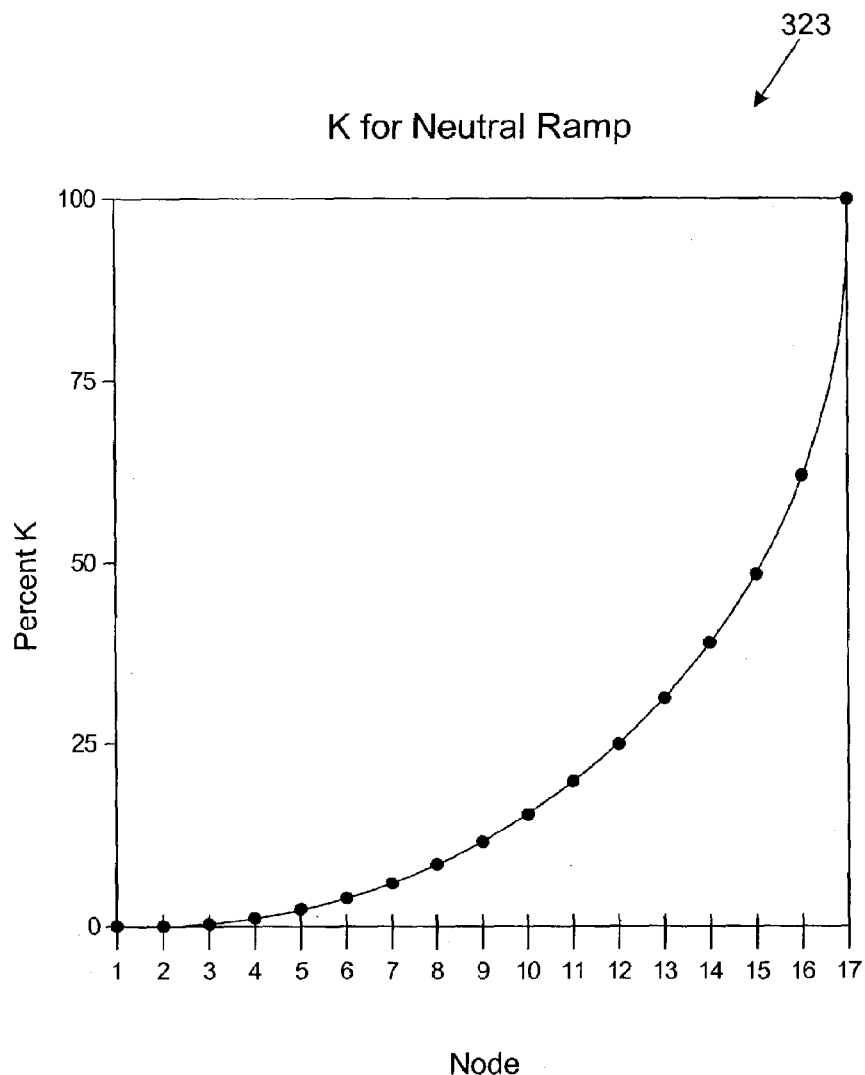
FIG. 8 is an example of a graph that plots a percentage of black K for each node along a neutral ramp, the percentages being employed by the neutral ramp of FIG. 7.

With reference to FIG. 8, shown is an example of a graph 323 that may be employed to determine the black K value for the initial one of the nodes 156 (FIG. 3) falling on the neutral ramp 169 (FIG. 2) as set forth in box 303 (FIG. 7) according to an embodiment of the present invention. In this respect, the curve shown is an exponential curve that indicates no black K component for the "0" node which is also the white node 156 (FIG. 2). Also, the black component is 100% for the $17^{th}$ node which corresponds to the black node 156 (FIG. 2). The curve shown is merely an example of the multitudes of curves that may be employed to determine the black component along the neutral ramp 169. For example, the curve may be linear or may employ some other configuration. In this respect, one skilled in the art may specify an appropriate curve to be used to determine the black values K depending upon the desired results. To determine the actual black values K, the neutral ramp calculator 136 may employ an appropriate equation that is used to generate the curve depicted in FIG. 8 or that generates a different curve as specified by one of ordinary skill in the art.

Figure 9:
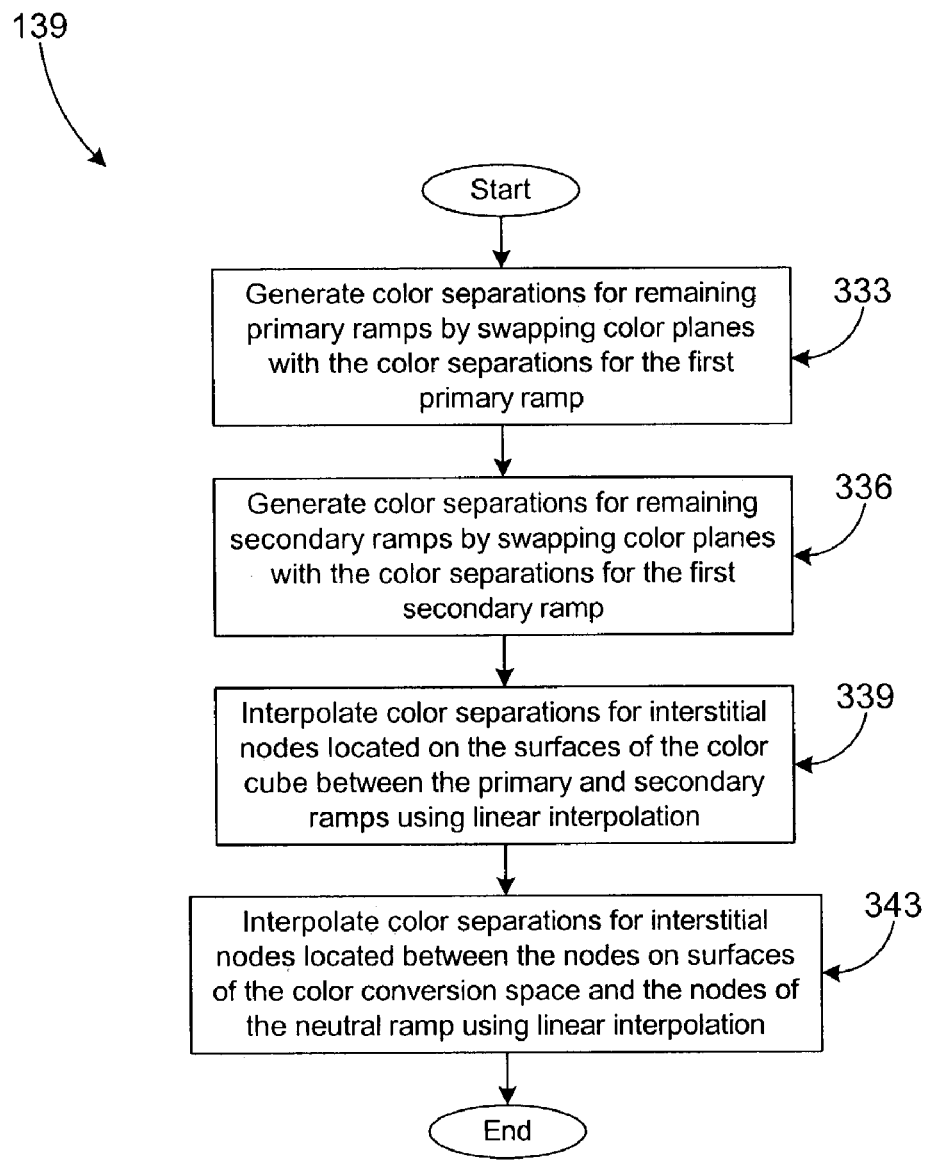
FIG. 9 is an example of a flow chart of an embodiment of a color separation interpolator that is executed as a component of the color separation calculation system of FIG. 1 according to an embodiment of the present invention.

Referring next to FIG. 9, shown is a flow chart that provides one example of the operation of the color separation interpolator 139 according to an embodiment of the present invention. Alternatively, the flow chart of FIG. 9 may be viewed as depicting steps of an example of a method implemented in the computer system 100 to calculate color separations for interstitial nodes 156 in the color conversion space 153. The functionality of the color separation interpolator 139 as depicted by the exemplary flow chart of FIG. 9 may be implemented, for example, in an object oriented design or in some other programming architecture. Assuming the functionality is implemented in an object oriented design, then each block represents functionality that may be implemented in one or more methods that are encapsulated in one or more objects. The color separation interpolator 139 may be implemented using any one of a number of programming languages such as, for example, C, C++, JAVA, Perl, Python, Flash, or other programming languages.

Beginning with box 333, the color separation interpolator 139 determines color separations for any remaining primary ramps 163 (FIG. 2) that were not initially calculated using the primary ramp calculator 129. This may be done, for example, by using the color separations determined in the first one of the primary ramps 163. Specifically, the same color separations are employed for the remaining primary ramps 163, however, the color planes are swapped as is appropriate to obtain the color separations for the remaining primary ramps 163. Thereafter, in box 336, the color separation interpolator 139 determines color separations for any remaining secondary ramps 166 (FIG. 2) that were not initially calculated using the secondary ramp calculator 133. This may be done, for example, by using the color separations determined in the first one of the secondary ramps 166. Specifically, the same color separations are employed for the remaining secondary ramps 166, however, the color planes are swapped as is appropriate to generate the color for the remaining secondary ramps 166.

Next, in box 339, the color separations for interstitial nodes between the primary and secondary ramps 163 and 166 on the surfaces of the color conversion space 153 are interpolated using a linear interpolation or other interpolation approach and are stored in the color separation table 151 (FIG. 1). Thereafter, in box 343, the color separations for the interstitial nodes located between the nodes on surfaces of the color conversion space 153 and the nodes 156 of the neutral ramp 169 are interpolated using linear interpolation or other approach and are stored in the color separation table 151. Thereafter, the color separation interpolator 139 ends.

Figure 10:
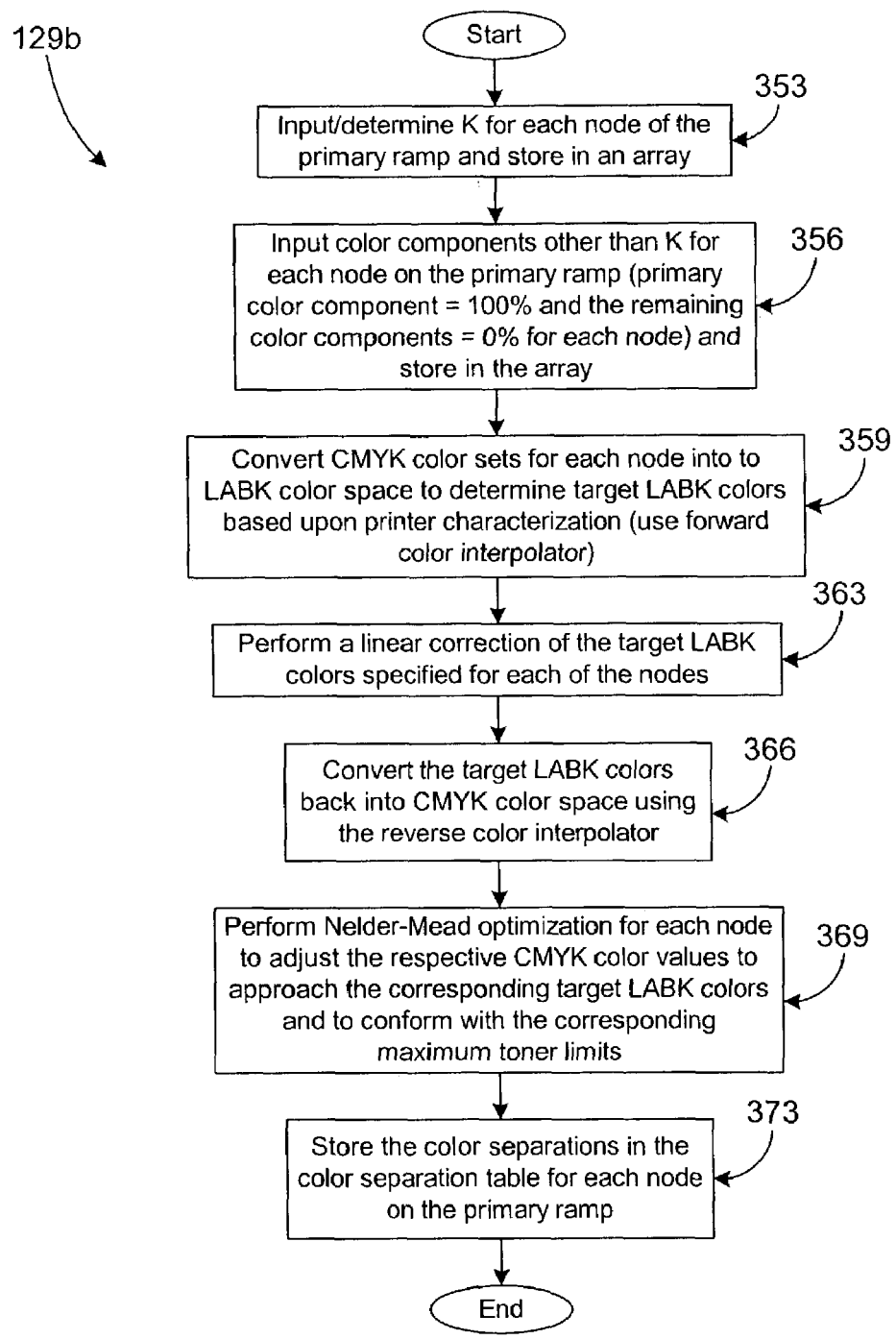
FIG. 10 is an example of a flow chart of a second embodiment of a primary ramp calculator that is executed as a component of the color separation calculation system of FIG. 1 according to an embodiment of the present invention.

Turning then to FIG. 10, shown is a flow chart that provides the operation of an alternative embodiment of the primary ramp calculator 129 denoted herein as primary ramp calculator 129b according to an embodiment of the present invention. Alternatively, the flow chart of FIG. 10 may be viewed as depicting steps of an example of a method implemented in the computer system 100 (FIG. 1) to generate the maximum toner limited color separations for the nodes 156 (FIG. 3) of a first one of the primary ramps 163 (FIG. 2). In this respect, the functionality of the flow chart of FIG. 10 would be executed for a first one of the primary ramps 163 for which color separations are to be determined. The functionality of the primary ramp calculator 129b as depicted by the exemplary flow chart of FIG. 10 may be implemented, for example, in an object oriented design or in some other programming architecture. Assuming the functionality is implemented in an object oriented design, then each block represents functionality that may be implemented in one or more methods that are encapsulated in one or more objects. The primary ramp calculator 129b may be implemented using any one of a number of programming languages such as, for example, C, C++, JAVA, or other programming languages. Alternatively, a programming language such as MATLAB promulgated by Mathworks of Natick, Me. may be employed.

Beginning with box 353, a black value K is input or calculated for each node of the first primary ramp 163 and the black values K are stored in an array as components of corresponding CMYK color sets. In this respect, for each node 156 the black value K may range from 0% to 100% and may be calculated, for example, based upon the distance of a respective node 156 from the black node 156 along the current primary ramp 163 or using some other approach. For example, the values for black K may reduce in magnitude as the distance from the black node 156 increases. Thereafter, in box 356, values representing the amounts of color components other than the black color component K such as cyan, magenta, and yellow are input. In this respect, the primary color component is usually at or near 100% and the remaining color components are set near or equal to 0%. These values are stored in the array along with the black values K for each of the nodes 156.

Then, in box 359, the CMYK color sets for all of the nodes 156 along the primary ramp 163 are converted into LABK color space to identify target LABK colors based upon the printer color characterization. In this respect, the forward color interpolator 143 is employed to perform the conversion of the CMYK color set for each node 156 along the primary ramp 163. Thereafter, in box 363, a linear correction of the LABK colors specified for each of the nodes 156 is performed to correct for any inaccuracies in appearance of the LABK colors due to non-linear or variable spacing between the nodes 156 in the LABK color space. Specifically, the correction modifies the LABK colors specified for each of the nodes 156, for example, so that they appear along the same curved line with equal spacing in the LABK color space.

Then, in box 366, the target LABK colors are converted back into CMYK color space as initial CMYK color sets or initial color separations using the reverse color interpolator 146 for each of the nodes 156 along the primary ramp 163. Unfortunately, the reverse color interpolation may be subject to unwanted error that is typically greater than any error created by the forward color interpolator 143. To minimize such an error, in box 369, an optimization process is performed such as, for example, a Nelder-Mead optimization for each of the nodes 156. That is to say, the color component values of the initial CMYK color sets are repeatedly altered and forward color interpolations are repeatedly performed until the resulting LABK colors approach or equal the target LABK colors determined in box 363. The Nelder-Mead optimization is performed to alter the CMYK color values for each of the nodes in a manner so as to generate a corresponding LABK color that matches or approaches the target LABK color and to ensure that the total amount of toner specified by the CMYK color values is less than or equal to the maximum toner limit for the respective nodes 156. Given that the forward color interpolator 143 is employed in this process, the resulting CMYK color values for each node 156 are determined based upon the printer color characterization. In addition, optimizations other than a Nelder-Mead optimization may be performed.

Then, in box 373, the primary ramp calculator 129b stores the resulting color separations expressed in CMYK color space or other color space as is appropriate for each node 156 in the primary ramp 163 in the color separation table 151. Thereafter, the primary ramp calculator 129b ends accordingly.

Figure 11:
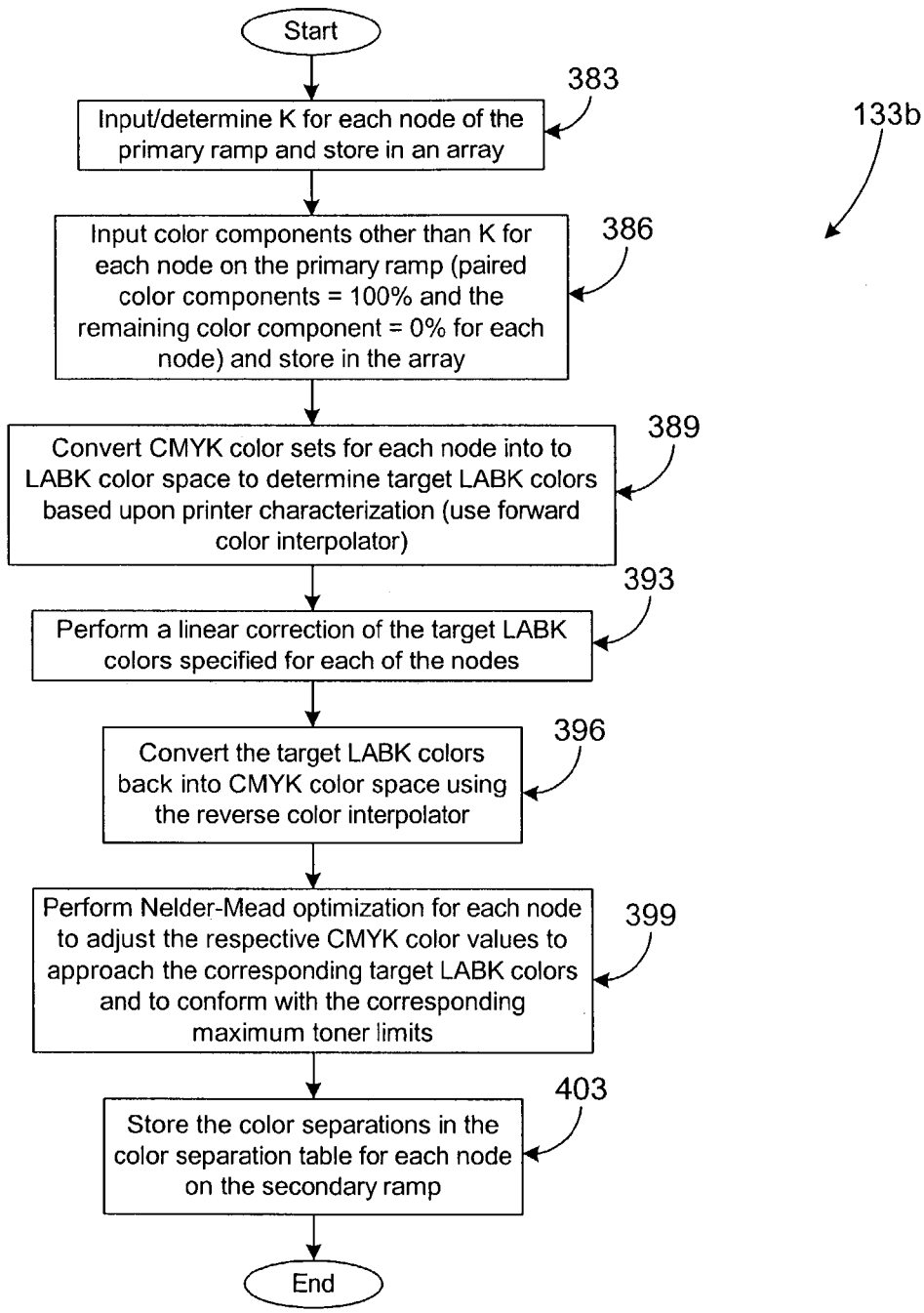
FIG. 11 is an example of a flow chart of a second embodiment of a secondary ramp calculator that is executed as a component of the color separation calculation system of FIG. 1 according to an embodiment of the present invention.

Turning then to FIG. 11, shown is a flow chart that provides the operation of an alternative embodiment of the secondary ramp calculator 133 denoted herein as secondary ramp calculator 133b according to an embodiment of the present invention. Alternatively, the flow chart of FIG. 11 may be viewed as depicting steps of an example of a method implemented in the computer system 100 (FIG. 1) to generate the maximum toner limited color separations for the nodes 156 (FIG. 3) of a first one of the secondary ramps 166 (FIG. 2). In this respect, the functionality of the flow chart of FIG. 11 would be executed for a first one of the secondary ramps 166 for which color separations are to be determined. The functionality of the secondary ramp calculator 133b as depicted by the exemplary flow chart of FIG. 11 may be implemented, for example, in an object oriented design or in some other programming architecture. Assuming the functionality is implemented in an object oriented design, then each block represents functionality that may be implemented in one or more methods that are encapsulated in one or more objects. The primary ramp calculator 133b may be implemented using any one of a number of programming languages such as, for example, C, C++, JAVA, or other programming languages. Alternatively, a programming language such as MATLAB promulgated by Mathworks of Natick, Me. may be employed.

Beginning with box 383, a black value K is input or calculated for each node of the first secondary ramp 166 and the black values K are stored in an array as components of corresponding CMYK color sets. In this respect, for each node 156 the black value K may range from 0% to 100% and may be calculated, for example, based upon the distance of a respective node 156 from the black node 156 along the current secondary ramp 166 or using some other approach. For example, the values for black K may reduce in magnitude as the distance from the black node 156 increases. Thereafter, in box 386, values representing the amounts of color components other than the black color component K such as cyan, magenta, and yellow are input. For each of the secondary ramps 166, two of these three color components are equal as can be appreciated by those with ordinary skill in the art. These equal color components are "paired" color components. In box 386, the paired color components are set at a value that is near or equal to 100% and the remaining color component is set at a value that is near or equal to 0% for all nodes 156 falling on the first one of the secondary ramps 166. These values are stored in the array along with the black values K for each of the nodes 156 in the array identified in box 383.

Then, in box 389, the CMYK color sets for all of the nodes 156 along the secondary ramp 166 stored in the array are converted into LABK color space to identify target LABK colors based upon the printer color characterization. In this respect, the forward color interpolator 143 is employed to perform the conversion of the CMYK color set for each node 156 along the secondary ramp 166. Thereafter, in box 393, a linear correction of the LABK colors specified for each of the nodes 156 is performed to correct for any inaccuracies in appearance of the LABK colors due to non-linear or variable spacing between the nodes 156 in the LABK color space. Specifically, the correction modifies the LABK colors specified for each of the nodes 156, for example, so that they appear along the same curved line with equal spacing in the LABK color space.

Then, in box 396, the target LABK colors are converted back into CMYK color space as initial CMYK color sets or initial color separations using the reverse color interpolator 146 for each of the nodes 156 along the secondary ramp 166. Unfortunately, the reverse color interpolation may be subject to unwanted error that is typically greater than any error created by the forward color interpolator 143. To minimize such an error, in box 399, an optimization process is performed such as, for example, a Nelder-Mead optimization for each of the nodes 156. That is to say, the color component values of the initial CMYK color sets are repeatedly altered and forward color interpolations are repeatedly performed until the resulting LABK colors approach or equal the target LABK colors determined in box 393. Also, the Nelder-Mead optimization is performed to alter the CMYK color values for each of the nodes in a manner so as to generate a corresponding LABK color that matches or approaches the target LABK color and to ensure that the total amount of toner specified by the CMYK color values is less than or equal to the maximum toner limit for the respective nodes 156. Given that the forward color interpolator 143 is employed in this process, the resulting CMYK color values for each node 156 are determined based upon the printer color characterization. In addition, optimizations other than a Nelder-Mead optimization may be performed.

Then, in box 403, the secondary ramp calculator 133b stores the resulting color separations expressed in CMYK color space or other color space as is appropriate for each node 156 in the secondary ramp 166 in the color separation table 151. Thereafter, the secondary ramp calculator 133b ends accordingly.

Figure 12:
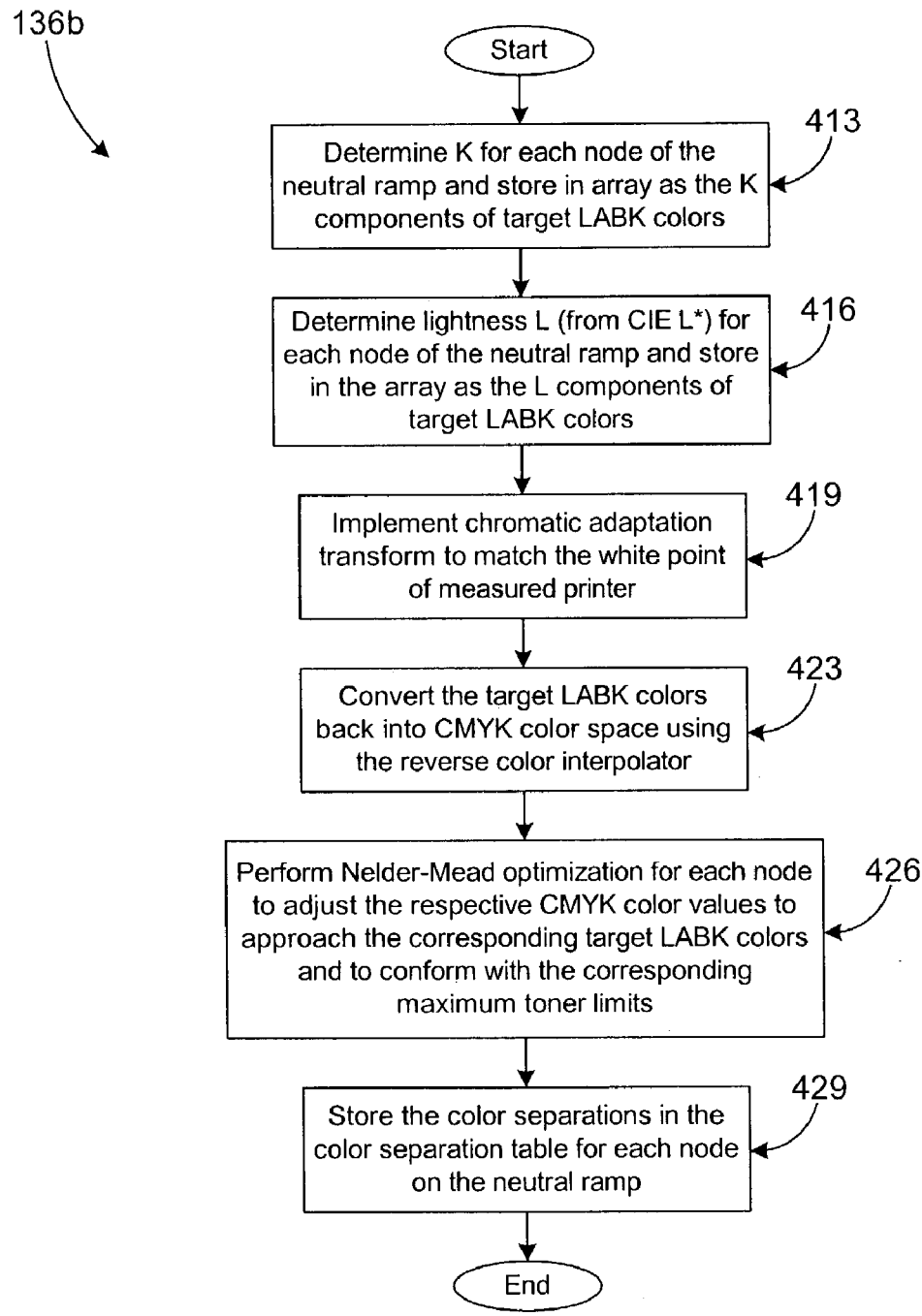
FIG. 12 is an example of a flow chart of a second embodiment of a neutral ramp calculator that is executed as a component of the color separation calculation system of FIG. 1 according to an embodiment of the present invention.

Referring next to FIG. 12, shown is a flow chart that provides the operation of an alternative embodiment of the neutral ramp calculator 136 denoted herein as neutral ramp calculator 136b according to an embodiment of the present invention. Alternatively, the flow chart of FIG. 12 may be viewed as depicting steps of an example of a method implemented in the computer system 100 (FIG. 1) to generate a maximum toner limited color separation for each of the nodes falling on the neutral ramp 169 (FIG. 2). The functionality of the neutral ramp calculator 136b as depicted by the exemplary flow chart of FIG. 12 may be implemented, for example, in an object oriented design or in some other programming architecture. Assuming the functionality is implemented in an object oriented design, then each block represents functionality that may be implemented in one or more methods that are encapsulated in one or more objects. The neutral ramp calculator 136b may be implemented using any one of a number of programming languages such as, for example, C, C++, JAVA, or other programming languages. Alternatively, a programming language such as MATLAB promulgated by Mathworks of Natick, Me. may be employed.

Beginning with box 413, the neutral ramp calculator 136b determines a black value K for each node 156 of the neutral ramp 169 and stores the black values K in an array as the K components of target LABK colors. This may be done, for example, by using a linear calculation, an exponential calculation, or other calculation using an appropriate equation to indicate the black value K for each node along the neutral ramp 169 as was be described, for example, with reference to FIG. 8. Alternatively, the values for black K for each node 156 along the neutral ramp 169 may be input individually, etc. Thereafter, in box 416, a lightness L is identified for each of the nodes 156 along the neutral ramp 169 as set forth in the CIE L*a*b* color space. The lightness L determined for each of the nodes 156 are also stored in the array as the L components of the target LABK colors. A lightness L may be determined for each of the nodes 156 in a manner similar to that discussed above with reference to box 306 of FIG. 7.

Then, in box 419, a chromatic adaptation transform is applied to the color separations of the nodes 156 along the neutral ramp 169 in the LABK color space to cause them to match the white point of the printer measured in creating the forward and reverse color interpolators 143 (FIG. 1) and 146 (FIG. 1). This chromatic adaptation transform employed may be any one of a number of chromatic adaptation transforms such as those set forth by VonKries, Bradford, Hunt, Sharp, or other chromatic adaptation transform as is known by those with ordinary skill in the art.

Thereafter, in box 423, the target LABK colors expressed in the LABK color space for the nodes 156 along the neutral ramp 169 are converted to a desired color space such as, for example, a CMYK color space. In such a case, the A and B values of the target LABK colors are zero since these values fall on the neutral ramp 169. The CMYK color sets generated are stored in the memory 106 (FIG. 1) as initial CMYK color sets or initial color separations. This conversion is performed using the reverse color interpolator 146. Unfortunately, the reverse color interpolation may be subject to unwanted error that is typically greater than any error created by the forward color interpolator 143.

To minimize such an error, in box 426, an optimization process is performed such as, for example, a Nelder-Mead optimization for each of the nodes 156. That is to say, the color component values of the initial CMYK color sets are repeatedly altered and forward color interpolations are repeatedly performed until the resulting LABK colors approach or equal the target LABK colors determined in boxes 413 and 416. Also, the Nelder-Mead optimization is performed to alter the CMYK color values for each of the nodes 156 in a manner so as to generate a corresponding LABK color that matches or approaches the target LABK color and to ensure that the total amount of toner specified by the CMYK color values is less than or equal to the maximum toner limit for the respective nodes 156. Given that the forward color interpolator 143 is employed in this process, the resulting CMYK color values for each node 156 are determined based upon the printer color characterization. In addition, optimizations other than a Nelder-Mead optimization may be performed.

Then, in box 429, the color separations expressed in the CMYK color space or other appropriate color space for printing are stored in the color separation table 151 (FIG. 1) in the memory 106. Thereafter, the neutral ramp calculator 136b ends accordingly.

Although the various components of the color separation calculation system 126 discussed above are embodied in software or code executed by general purpose hardware as discussed above, as an alternative they may also be embodied in dedicated hardware or a combination of software/general purpose hardware and dedicated hardware. If embodied in dedicated hardware, the various components of the color separation calculation system 126 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 4-7 and 9-12 show the architecture, functionality, and operation of an implementation of the various components of the color separation calculation system 126. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 4-7 and 9-12 show a specific order of execution, it is understood that the order of execution may differ from that which is depicted. For example, the order of execution of two or more blocks may be scrambled relative to the order shown. Also, two or more blocks shown in succession in FIGS. 4-7 and 9-12 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the various components of the color separation calculation system 126 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the various components of the color separation calculation system 126 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for determining color separation, comprising the steps of:
    specifying a number of nodes along a number of ramps in a predefined color conversion space in a computer system, wherein a maximum possible toner deposit is associated with each of the nodes along the ramps;
    specifying a maximum toner limit for each one of the nodes along the ramps in the computer system, wherein each of the maximum toner limits is less than the maximum possible toner deposit;
    determining a color separation for each of the nodes along the ramps in the computer system; and reducing an amount of toner associated with each respective one of the color separations by only reducing an amount of toner of an independent color component, or a set of paired color components so that each respective one of the color separations specifies up to a maximum amount of toner equaling a corresponding one of the maximum toner limits.

2. The method of claim 1, wherein the step of determining the color separation for each of the nodes along the ramps further comprises determining the color separations for each of the nodes based upon a printer color characterization.

3. The method of claim 1, further comprising the step of interpolating a color separation for each one of a number of interstitial nodes from the color separations of the nodes along the ramps in the computer system.

4. The method of claim 1, wherein the step of determining the color separation for each of the nodes along the ramps in the computer system further comprises the steps of:
   calculating a number of potential color separations for each of the nodes along the ramps; and
   identifying one of the potential color separations having a maximum colorfulness as the color separation for each of the nodes along the ramps.

5. The method of claim 1, wherein the step of determining the color separation for each of the nodes along the ramps further comprises the step of determining the color separation for each of the nodes along a primary ramp of a predefined color conversion space.

6. The method of claim 1, wherein the step of determining the color separation for each of the nodes along the ramps further comprises the step of determining the color separation for each of the nodes along a secondary ramp of a predefined color conversion space.

7. The method of claim 1, wherein the step of determining the color separation for each of the nodes along the ramps further comprises the step of determining the color separation for each of the nodes along a neutral ramp of a predefined color conversion space.

8. The method of claim 1, wherein the step of determining the color separation for each of the nodes along the ramps in the computer system further comprises the steps of:
   determining an initial color separation for each of the nodes along the ramps; and
   performing an optimization on each of the initial color separations to obtain the color separations for each of the nodes, wherein the optimization causes each of the color separations to approach a corresponding target color and the optimization results in each of the color separations specifying up to the maximum amount of toner equaling the corresponding one of the maximum toner limits.

9. The method of claim 8, wherein the step of performing the optimization on each of the initial color separations to obtain the color separations for each of the nodes further comprises the step of performing a Nelder-Mead optimization.

10. A program embodied in a computer readable medium for determining color separation, comprising:
   code that defines a number of nodes specified along a number of ramps in a predefined color conversion space, wherein a maximum possible toner deposit is associated with each of the nodes along the ramps;
   code that defines a maximum toner limit specified for each one of the nodes along the ramps, wherein each of the maximum toner limits is less than the maximum possible toner deposit;
   code that determines a color separation for each of the nodes along the ramps; and
   code that reduces an amount of toner associated with each respective one of the color separations by only reducing an amount of toner of an independent color component, or a set of paired color components so that each of the color separations specifies up to a maximum amount of toner equaling a corresponding one of the maximum toner limits.

11. The program embodied in the computer readable medium of claim 10, wherein the code that determines the color separation for each of the nodes along the ramps further comprises code that determines the color separations for each of the nodes based upon a printer color characterization.

12. The program embodied in the computer readable medium of claim 10, further comprising code that interpolates a color separation for each one of a number of interstitial nodes from the color separations of the nodes along the ramps.

13. The program embodied in the computer readable medium of claim 10, wherein the code that determines the color separation for each of the nodes along the ramps further comprises:
   code that calculates a number of potential color separations for each of the nodes along the ramps; and
   code that identifies one of the potential color separations having a maximum colorfulness as the color separation for each of the nodes along the ramps.

14. The program embodied in the computer readable medium of claim 10, wherein the code that determines the color separation for each of the nodes along the ramps further comprises code that determines the color separation for each of the nodes along a primary ramp of a predefined color conversion space.

15. The program embodied in the computer readable medium of claim 10, wherein the code that determines the color separation for each of the nodes along the ramps further comprises code that determines the color separation for each of the nodes along a secondary ramp of a predefined color conversion space.

16. The program embodied in the computer readable medium of claim 10, wherein the code that determines the color separation for each of the nodes along the ramps further comprises code that determines the color separation for each of the nodes along a neutral ramp of a predefined color conversion space.

17. The program embodied in the computer readable medium of claim 10, wherein the code that determines the color separation for each of the nodes along the ramps further comprises:
   code that determines an initial color separation for each of the nodes along the ramps; and
   code that performs an optimization on each of the initial color separations to obtain the color separations for each of the nodes, wherein the optimization causes each of the color separations to approach a corresponding target color and the optimization results in each of the color separations specifying up to the maximum amount of toner equaling the corresponding one of the maximum toner limits.

18. The program embodied in the computer readable medium of claim 17, wherein the code that performs the optimization on each of the initial color separations to obtain the color separations for each of the nodes further comprises code that performs a Nelder-Mead optimization.

19. A system for determining color separation, comprising:
   means for defining a number of nodes specified along a number of ramps in a predefined color conversion space, wherein a maximum possible toner deposit is associated with each of the nodes along the ramps;

means for defining a maximum toner limit specified for each one of the nodes along the ramps, wherein each of the maximum toner limits is less than the maximum possible toner deposit;

means for determining a color separation for each of the nodes along the ramps; and means for reducing an amount of toner associated with each respective one of the color separations by only reducing an amount of toner of an independent color component or a set of paired color components so that each of the color separations specifies up to a maximum amount of toner equaling a corresponding one of the maximum toner limits.

20. The system of claim 19, wherein the means for determining the color separation for each of the nodes along the ramps further comprises means for determining the color separations for each of the nodes based upon a printer color characterization.

21. The system of claim 19, further comprising means for interpolating a color separation for each one of a number of interstitial nodes from the color separations of the nodes along the ramps.

22. The system of claim 19, wherein the means for determining the color separation for each of the nodes along the ramps further comprises:

means for calculating a number of potential color separations for each of the nodes along the ramps; and means for identifying one of the potential color separations having a maximum colorfulness as the color separation for each of the nodes along the ramps.

23. The system of claim 19, wherein the means for determining the color separation for each of the nodes along the ramps further comprises:

means for determining an initial color separation for each of the nodes along the ramps; and means for performing an optimization on each of the initial color separations to obtain the color separations for each of the nodes, wherein the optimization causes each of the color separations to approach a corresponding target color and the optimization results in each of the color separations specifying up to the maximum amount of toner equaling the corresponding one of the maximum toner limits.

24. The system of claim 23, wherein the optimization further comprises a Nelder-Mead optimization.

25. A system for determining color separation, comprising:
a processor circuit having a processor and a memory;
a color separation calculation system stored in the memory and executable by the processor, the color separation calculation system comprising:
  a number of nodes defined in the memory that are specified along a number of ramps in a predefined color conversion space, wherein a maximum possible toner deposit is associated with each of the nodes along the ramps;
  a maximum toner limit stored in the memory that is specified for each one of the nodes along the ramps, wherein each of the maximum toner limits is less than the maximum possible toner deposit;
  logic that determines a color separation for each of the nodes along the ramps; and
  logic that reduces an amount of toner associated with each respective one of the color separations by only reducing an amount of toner of an independent color component. or a set of paired color components so that each of the color separations specifies up to a maximum amount of toner equaling a corresponding one of the maximum toner limits.

26. The system of claim 25, wherein the logic that determines the color separation for each of the nodes along the ramps further comprises logic that determines the color separations for each of the nodes based upon a printer color characterization.

27. The system of claim 25, further comprising logic that interpolates a color separation for each one of a number of interstitial nodes from the color separations of the nodes along the ramps.

28. The system of claim 25, wherein the ramps further comprise a primary ramp of a predefined color conversion space.

29. The system of claim 25, wherein the ramps further comprise a secondary ramp of a predefined color conversion space.

30. The system of claim 25, wherein the ramps further comprise a neutral ramp of a predefined color conversion space.

* * * * *

UNITED STATES PATENT AND TRADEMARK OFFICE
CERTIFICATE OF CORRECTION

PATENT NO. : 7,433,100 B2 Page 1 of 1
APPLICATION NO. : 10/448596
DATED : October 7, 2008
INVENTOR(S) : Steve A. Jacob It is certified that error appears in the above-identified patent and that said Letters Patent is hereby corrected as shown below:

In column 22, line 22, in Claim 25, delete "component." and insert -- component, --, therefor.

Signed and Sealed this

Tenth Day of March, 2009

JOHN DOLL
*Acting Director of the United States Patent and Trademark Office*